(12) United States Patent
Amaya et al.

(10) Patent No.: US 11,073,816 B1
(45) Date of Patent: Jul. 27, 2021

(54) MACHINE TOOL OPERATION MONITORING SYSTEM

(71) Applicant: Matsuura Machinery Corporation, Fukui (JP)

(72) Inventors: Koichi Amaya, Fukui (JP); Yasunori Takezawa, Fukui (JP); Kazuya Yamauchi, Fukui (JP)

(73) Assignee: Matsuura Machinery Corporation, Fukui (JP)

(*) Notice: Subject to any disclaimer, the term of this patent is extended or adjusted under 35 U.S.C. 154(b) by 0 days.

(21) Appl. No.: 17/049,165

(22) PCT Filed: Mar. 16, 2020

(86) PCT No.: PCT/JP2020/011490
§ 371 (c)(1),
(2) Date: Oct. 20, 2020

(87) PCT Pub. No.: WO2021/019828
PCT Pub. Date: Feb. 4, 2021

(30) Foreign Application Priority Data

Aug. 1, 2019 (JP) .............................. JP2019-141876

(51) Int. Cl.
*G05B 19/4065* (2006.01)
(52) U.S. Cl.
CPC .................. *G05B 19/4065* (2013.01); *G05B 2219/34465* (2013.01)

(58) Field of Classification Search
CPC .................. G05B 2219/34465; G05B 19/4065
See application file for complete search history.

(56) References Cited

U.S. PATENT DOCUMENTS

| 2017/0270771 | A1  | 9/2017 | Zhang |
| 2018/0097564 | A1* | 4/2018 | Sekiya ............. H01L 21/67276 |
| 2018/0101144 | A1* | 4/2018 | Fuger .................. G06F 11/3409 |

FOREIGN PATENT DOCUMENTS

| JP | 6-331507    | A   |    | 12/1994 |
| JP | 2002-132324 | A   |    |  5/2002 |
| JP | 2002132324  | A   | *  |  5/2002 |
| JP | 2018-112920 | A   |    |  7/2018 |
| JP | 2018-169827 | A   |    | 11/2018 |
| JP | 2018169827  | A   | *  | 11/2018 |

* cited by examiner

*Primary Examiner* — Jennifer Bahls
(74) *Attorney, Agent, or Firm* — Richard M. Goldberg

(57) ABSTRACT

A machine tool operation monitoring system which detects an abnormal operation of a machine tool 1 and in which when the operation of each machine tool 1 exceeds a normal operating range of each machine tool 1 and/or when a moving state of a constituent portion of the machine tool 1 and a material exceeds a normal range, wherein the machine tool 1 breaking out an operation abnormality is identified by any one of the following operations:
a. monitoring an image obtained by projecting reflected light from a reflecting display plate 22 provided for each machine tool 1 onto a camera 31; and
b. monitoring a difference in projecting direction of emitted light from a lamp 21 provided for each machine tool 1 onto an optical sensor 32.

16 Claims, 1 Drawing Sheet

[Fig.1]
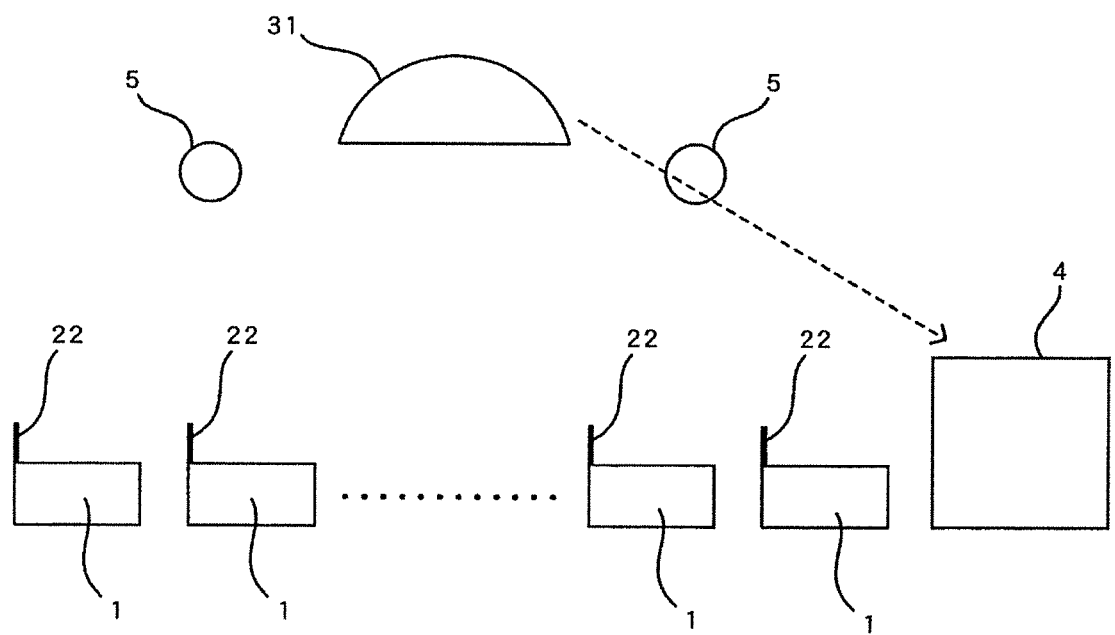
[Fig.2]
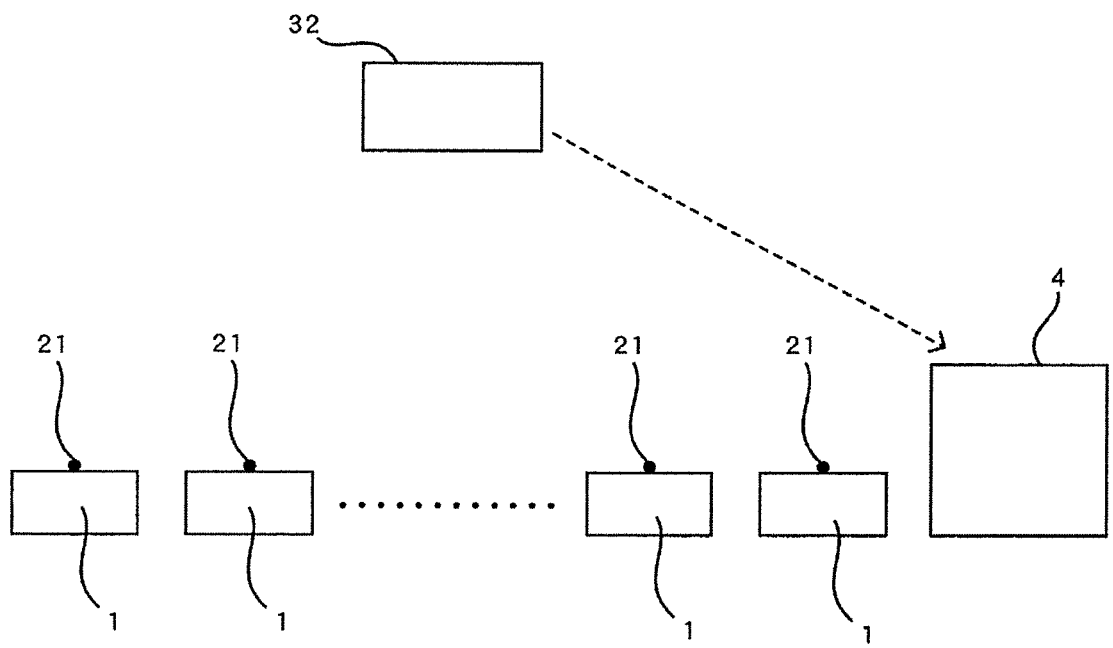

MACHINE TOOL OPERATION MONITORING SYSTEM

TECHNICAL FIELD

The present invention relates to a machine tool operation monitoring system that monitors whether a plurality of machine tools placed in a workplace are normally operating or not.

BACKGROUND OF THE INVENTION

When a plurality of process units placed in a workplace automatically process a predetermined object under automatic control, it is essential to have a monitoring system that determines whether an operation state of each process unit is normal.

Necessary state of the determination is especially outstanding when a process unit is a machine tool. In conventional technology, when the operation of a machine is detected, a detection signal to notify an abnormality that has occurred in an individual process unit in operation is transmitted to a monitoring apparatus in a wired or wireless manner.

However, when such a signal is transmitted, the monitoring apparatus needs to have a mechanism for accurately distinguishing from which process unit the signal is generated.

More specifically, it is necessary to perform accurate distinguishing on the basis of the voltage, current, frequency (in the case of AC signals), waveform, or the like that each signal uses depending on the location of each process unit and additionally, the monitoring apparatus needs to have the mechanism for performing this accurate distinguishing.

Concretely, it is considerably cumbersome to transmit different signals in correspondence with the respective process units and install an accurate distinguishing mechanism for the respective signals.

When a lamp is turned on to notify the abnormality upon occurrence of the abnormality in each process unit, it is not necessary to transmit the above signal.

However, when there are a plurality of machine tools installed in a workplace, it is very difficult for a person in charge of monitoring to avoid an accident of overlooking a lighting of the lamp, and eventually, this makes it very difficult to monitor an abnormality reliably in the operation of each process unit in the workplace.

According to Patent Document 1 disclosing a server abnormality detection system, an imaging device 11 photographs an abnormality detection lamp provided on a front panel of a server 51, and a control management unit 20 calculates a difference between a first luminance which is the luminance of the lamp photographed by the imaging device 11 and a second luminance which is the luminance of the lamp in a reference image, and determines that the server 51 is abnormal if the calculated difference is equal to or more than a preset threshold (in the section of "Solution" of Abstract).

However, because turning on the abnormality detection lamp allows the server 51 to sense the possibility of the abnormality in the server 51, there is a great deal of uncertainty as to whether the calculation of the difference as described above is necessary or not.

In addition, when a plurality of the servers 51 are placed in the workplace, the control management unit 20 needs to incorporate the mechanism for accurately distinguishing each imaging device 11 in order to determine whether the corresponding difference is equal to or more than the threshold. In this regard, this mechanism is the same as the mechanism for transmitting a signal as in the conventional technology.

According to Patent Document 2 disclosing a monitoring diagnosis system for a plant, an abnormality in the state of the plant is monitored and diagnosed (in claim 3), and an embodiment configured to display in color the state of the plant is also adopted, and furthermore, it is understood that this embodiment is configured to also display in color the abnormality in the plant.

Patent Document 2, however, gives no specific description about how the system accurately distinguishes an abnormal operation in a plurality of constituent elements of the plant in the operation.

As far as the present applicant has searched, there is no known technique that can identify the machine tool breaking out the abnormality while eliminating the need for a mechanism for accurately distinguishing a signal notifying the abnormality in a plurality of the machine tools when comprehensively monitoring an operation abnormality in each machine tool placed in the workplace.

PRIOR ART DOCUMENTS

Patent Documents

Patent Document 1: Japanese Published Unexamined Patent Application No. 2018-112920
Patent Document 2: Japanese Published Unexamined Patent Application No. H06-331507

SUMMARY OF INVENTION

Technical Problem

The present invention stands on technical problem to provide the configuration of a machine tool operation monitoring system that can quickly identify a machine tool breaking out an abnormality without requiring any mechanism for accurately distinguishing a signal transmitting an abnormal operation in a plurality of machine tools in operation in a workplace.

Solution to Problem

In order to achieve the object described above, basic configurations of the present invention are provided by: (1) a machine tool operation monitoring system that detects an abnormal operation in a machine tool which performs cutting work on a material, wherein when a torque or speed of a drive motor exceeds a normal operating range in each of a plurality of machine tools and/or when moving positions of a constituent portion and of the material in reciprocating movement or rotational movement relative to the machine tool operated by the drive motor exceed a predetermined normal operating region range, the system identifies the machine tool breaking out an operation abnormality by projecting reflected light onto a camera photographing each machine tool by moving a reflecting display plate provided for each machine tool to a position where the reflecting display plate can reflect illumination light in a plant, and by monitoring the image associated with said projection;

(2) a machine tool operation monitoring system that detects an abnormal operation in a machine tool which performs cutting work on a material, wherein when a torque or speed of a drive motor exceeds a normal operating range in each of a plurality of machine tools and/or when moving positions of a constituent portion and of the material in reciprocating movement or rotational movement relative to the machine tool operated by the drive motor exceed a predetermined normal operating region range, the system identifies the machine tool breaking out an operation abnormality by projecting emitted light from a lamp provided for each machine tool onto an optical sensor situating at a position where the optical sensor can receive the emitted light from each lamp, and by monitoring a difference in a direction of said projection of the emitted light.

Advantageous Effects of Invention

According to the present invention based on the basic configurations (1) and (2), it is possible to identify the machine tool having experienced the abnormal operation by identifying the position of the reflecting display plate reflecting the illumination light by the camera photographing a plurality of the machine tools (in the case of the basic configuration (1)) or by identifying the direction of an optical signal in the optical sensor that has received the optical signal based on the flashing of the lamp in each machine tool (in the case of the basic configuration (2)), and therefore, this makes it possible to execute and achieve a monitoring function without any special mechanism required for accurately distinguishing a signal notifying the abnormal operation and performing identification as in the Prior Arts.

BRIEF DESCRIPTION OF DRAWINGS

FIG. 1 is a schematic side view showing the basic configuration (1); and
FIG. 2 is a schematic side view showing the basic configuration (2).

DESCRIPTION OF THE PREFERRED EMBODIMENTS

Typical examples of an abnormal operation state in which a machine tool 1 operating in a workplace is deviating from a normal operation state include:
a. a state in which the torque or speed of a drive motor exceeds a normal operating range; and
b. a state in which a constituent portion relative to the machine tool 1 operated by the drive motor and moving positions of material in a reciprocating movement or rotational movement exceed a predetermined normal operating region range.

In the basic configuration (1), in the state a and/or the state b, as shown in FIG. 1, a reflecting display plate 22 provided for each machine tool 1 is moved to a position in a plant at which illumination light 5 can be reflected to project reflected light onto a camera 31 photographing each machine tool 1, and therefore, an image of projection is monitored to identify the machine tool 1 breaking out an operation abnormality.

In the basic configuration (2), in the state a and/or the state b, as shown in FIG. 2, light emitted from a lamp 21 provided for each machine tool 1 is projected onto an optical sensor 32 situated at a position where the optical sensor 32 can receive the light emitted from each lamp 21, and the differences in projecting direction are monitored, thereby identifying the machine tool 1 breaking out the operation abnormality.

In the basic configuration (1), monitoring each image described above can identify the machine tool 1 breaking out the operation abnormality, and hence the above effect can be obtained without requiring an accurate distinguishing mechanism required for that identifying operation.

In the basic configuration (2) as well, monitoring the differences in the projecting direction among flashing light beams projected onto the optical sensor 32 can identify the machine tool 1 breaking out the operation abnormality, and hence the above effect can be obtained without requiring the accurate distinguishing mechanism required for that identifying operation.

Note that in order to perform each monitoring operation described above, in this invention, as shown in FIGS. 1 and 2, respectively, a monitoring region 4 is set for the images of the basic configuration (1), and the monitoring region 4 is set for the differences in direction of the basic configuration (2).

Moreover, in the basic configurations (1) and (2), in order to distinguish the abnormal operation based on the state a, an input voltage or input current is set for the drive motor by standard with the normal operating range of the torque, speed, or the moving position described above as a standard.

The present invention can adopt a new embodiment to be described below on the basis of the basic configurations (1) and (2).

The machine tool 1 breaking out the operation abnormality can be satisfactorily identified by monitoring the images of the basic configuration (1) and monitoring the differences in the projecting direction of the basic configuration (2).

Note, however, that adopting an embodiment (hereinafter referred to as the "first embodiment") characterized by assigning a number to each machine tool and additionally identifying the machine tool 1, identified by the detection of the operation abnormality, by displaying an image of the number of the machine tool 1, the machine tool 1 breaking out the operation abnormality with the displayed number can be quickly identified.

The identifying operation by the addition of the number is not limited to only the operation of displaying the image as described above.

Adopting an embodiment (hereinafter referred to as the "second embodiment") characterized by assigning a number to each machine tool 1 and additionally identifying the machine tool 1, and then identified by the detection of the operation abnormality with sound accompanying announcement of the number of the machine tool 1, the machine tool 1 breaking out the operation abnormality by the announcement can be identified even if there is no person in charge in the monitoring region 4 concerning the images of the basic configuration (1) and the directions of the basic configuration (2).

Each machine tool 1 performs continuous control with respect to the reciprocating movement or rotational movement of each constituent portion and the material, and this control is executed by a continuous signal for the constituent portion.

In such a case, an abnormal operation of a controller in each machine tool 1 can be quickly found by adopting an embodiment (hereinafter referred to as the "third embodiment") characterized by following construction:

when at least some of all control output signals are not continuous for a predetermined period in each controller unit that controls each corresponding machine tool 1, the abnormal operation of the controller unit is notified by turning on the lamp 21 configured to irradiate emitted light in a color different from the emitted light defined in the basic configuration (2) or the reflected light defined in the basic configuration (1), and by projecting the emitted light onto the camera 31 defined in the basic configuration (1) or the optical sensor 32 defined in the basic configuration (2).

And then this makes it possible to avoid a serious accident caused by an abnormality in control.

In each constituent portion of the machine tool 1, it is not possible to avoid friction due to contact between two portions and heat generation as a result of the friction.

Under these situations, each machine tool 1 is configured to perform cooling by circulating a lubricating oil for reducing and mitigating the friction due to contact and/or by circulating a cooling oil for mitigating the heat generation.

When the lubricating oil and/or the cooling oil are not normally circulated, in this case, the machine tool 1 may enter the abnormal operation state like the state b due to the friction or the heat generation.

In such a case, the abnormal operation state such as the state b can be prevented by adopting an embodiment (hereinafter referred to as the "fourth embodiment") characterized by following construction:

when the flow rate of the lubricating oil and/or of the cooling oil circulating in each machine tool 1 to lubricate and/or to cool the operation in each machine tool 1 is detected and the flow rate falls below a lower limit value, the lamp 21 configured to irradiate emitted light in a color different from the emitted light defined in the basic configuration (2) or the reflected light defined in the basic configuration (1) is turned on, and the emitted light is projected onto the camera 31 defined in the basic configuration (1) or the optical sensor 32 defined in the basic configuration (2).

As in the fourth embodiment, the abnormal heat generation sometimes occurs locally in the constituent portion regardless of mitigating a friction state of the portion that performs the reciprocating movement or rotational movement and mitigating a heat generation state by circulating a lubricating oil and/or a cooling oil.

The above abnormal heat generation occurs in most cases even if a lubricating oil and/or a cooling oil normally circulates when the constituent portion is deformed to result in a complete inability to cope with a problem by the circulation.

In such a case, a constituent portion that has entered the abnormal heat generation state can be quickly detected and repair of the constituent portion can be quickly executed by adopting an embodiment (hereinafter referred to as the "fifth embodiment") characterized by following construction:

when a temperature detector is set at the constituent portion that performs the reciprocating movement or rotational movement in each machine tool and detected temperature exceeds an upper limit value in the predetermined period, the lamp 21 configured to irradiate emitted light in a color different from the emitted light defined in the basic configuration (2) or the reflected light defined in the basic configuration (1) is turned on, and the emitted light is projected onto the camera 31 defined in the basic configuration (1) or the optical sensor 32 defined in the basic configuration (2).

In order to make each machine tool 1 operate, it is essential that a tool to be used for working be replaced with a corresponding one, the tool be transferred to the machine tool 1, and a pallet be transferred to each machine tool 1 after a workpiece serving as a unit of the material to be worked by the tool is mounted on the pallet.

However, a replacement device for the tool, a transfer device for the tool, and a pallet transfer device each sometimes undergo an accident such as the abnormal operation because of an abnormal connection relationship between corresponding drive regions and the respective devices although drive motors for driving the respective devices normally operate.

In such a case, the abnormal state of each device can be quickly detected and a necessary repair measure can be quickly taken by adopting an embodiment (hereinafter referred to as the "sixth embodiment") characterized by following construction:

when each of the replacement device for the tool to be used for working, the transfer device for the tool, the pallet on which the workpiece serving as a unit of the material to be worked is mounted, and a device for transferring the pallet does not operate although the input voltage or the input current is applied to the drive motor for driving each device, the lamp 21 configured to irradiate emitted light in a color different from the emitted light defined in the basic configuration (2) or the reflected light defined in the basic configuration (1) is turned on, and the emitted light is projected onto the camera 31 defined in the basic configuration (1) or the optical sensor 32 defined in the basic configuration (2), in each device.

When the machine tool 1 operates and cuts the workpiece, the machine tool 1 inevitably produces chips and/or fumes, and then the chips and fumes are moved by air blowing and collected by a collector with a filter.

When the air blowing that moves such chips and/or fumes does not reach a predetermined level, the chips and fumes remain in the machine tool 1, resulting in a serious trouble in the normal operation of the machine tool 1.

In such a case, it is possible to quickly detect that the flow rate of the air blowing or pressure of the air blowing has not reached the predetermined level and to quickly avoid the accumulation of the chips and the fumes in the workplace by adopting an embodiment (hereinafter referred to as the "seventh embodiment") characterized by following construction:

when the flow rate of the air blowing required to move the chips and/or the fumes generated due to the operation of each machine tool 1 to the collector with the filter or the air pressure based on the air blowing is detected and the flow rate or the air pressure falls below a lower limit value, the lamp 21 configured to irradiate emitted light in a color different from the emitted light defined in the basic configuration (2) or the reflected light defined in the basic configuration (1) is turned on, and the emitted light is projected onto the camera 31 defined in the basic configuration (1) or the optical sensor 32 defined in the basic configuration (2).

The first, second, third, fourth, fifth, sixth, and seventh embodiments described above can be adopted separately and in combination with each other.

In particular, assume that all the first, second, third, fourth, fifth, sixth, and seventh embodiments are adopted, and an embodiment is adopted which is characterized by selecting mutually different colors for light irradiated from the respective lamps 21 according to the respective embodiments and projecting each color of light onto the camera 31 of the basic configuration (1), or the optical sensor 32 of the basic configuration (2), in this case, it is possible to solve all the seven types of the abnormal states upon accurate distinguishing of the abnormal states to be monitored in the respective embodiments.

The following description will be made with reference to Examples 1 and 2.

Example 1

Example 1 is based on the basic configuration (2) and characterized in that each lamp 21 emits light in a color corresponding to a case in which the operation of each machine tool 1 falls within the normal operating range, in a color corresponding to a case in which the operation exceeds the normal operating range, or in a color corresponding to a case in which the operation has ended, and the state of change in the color of each machine tool 1 is recorded in a place where the operation of each machine tool 1 is monitored, concretely in the monitoring region 4, moreover, frequency of abnormal operation breaking out in each machine tool 1 is aggregated.

By aggregating the frequency of the abnormal operation breaking out in each machine tool 1, it is possible to statistically analyze problems and defects in the operation of each machine tool 1.

Example 2

Example 2 is based on the basic configuration (1) and characterized in that each reflecting display plate 22 is set at a position corresponding to a case in which the operation of each machine tool 1 falls within the normal operating range, at a position corresponding to a case in which the operation exceeds the normal operating range, or at a position corresponding to a case in which the operation has ended, and the state of change in the position of each reflecting plate is recorded in a place where the operation of each machine tool 1 is monitored, concretely in the monitoring region 4, moreover, the frequency of abnormal operation breaking out in each machine tool 1 is aggregated.

In Example 2 as well as in Example 1, it is possible to statistically analyze the problems and defects in the operation of each machine tool 1.

INDUSTRIAL APPLICABILITY

The present invention offers a revolutionary technical merit in quick identification of the machine tool breaking out the operation abnormality based on simple information, namely the image projected on the camera or the direction of projection onto the optical sensor, corresponding to the case that the machine tool placed in the workplace breaks out the operation abnormality, and offers a wide range of applications in the field of machine tools.

REFERENCE SIGNS LIST

1: Machine tool
21: Lamp
22: Reflecting display plate
31: Camera
32: Optical sensor
4: Monitoring region
5: Illumination light

What is claimed is:

1. A machine tool operation monitoring system that detects an abnormal operation in any of a plurality of machine tools which perform cutting work on a material, the system comprising:
   a camera photographing each machine tool,
   a reflecting display plate provided for each machine tool for projecting reflected light as a projection onto the camera to identify the machine tool breaking out an operation abnormality by moving the reflecting display plate provided for each machine tool to a position where the reflecting display plate can reflect illumination light in a plant to produce an image associated with the projection when one of the following occurs:
   a torque of a drive motor exceeds a normal operating range in any of the plurality of machine tools,
   a speed of a drive motor exceeds a normal operating range in any of the plurality of machine tools, or
   moving positions of a constituent portion and of a material in one of reciprocating movement or rotational movement relative to the machine tool operated by the drive motor exceed a predetermined normal operating region range, and
   a monitor for monitoring the image associated with said projection.

2. The machine tool operation monitoring system according to claim 1, wherein one of the following is set as a standard for detecting the operation abnormality of a torque, speed or moving position deviated from a normal operating range:
   an input voltage for a drive motor, or
   an input current for the drive motor.

3. The machine tool operation monitoring system according to claim 1, wherein a number is assigned to each machine tool, and the machine tool which is identified by detecting the operation abnormality is additionally identified by displaying an image of the number.

4. The machine tool operation monitoring system according to claim 3, wherein the machine tool which is identified by detecting the operation abnormality is additionally identified by a sound providing an announcement of the number.

5. The machine tool operation monitoring system according to claim 1,
   further comprising at least one controller unit that controls each corresponding machine tool and which produces control output signals for the machine tools, and
   a color lamp configured to irradiate emitted light in a color different from the reflected light,
   wherein, when at least some of all control output signals are not continuous for a predetermined period in each controller unit that controls each corresponding machine tool, the abnormal operation of the controller unit is notified by turning on the color lamp to irradiate emitted light in a color different from the reflected light, and by projecting the emitted light onto the camera.

6. The machine tool operation monitoring system according to claim 1, further comprising a color lamp configured to irradiate emitted light in a color different from the reflected light, which is turned on to project said emitted light on the camera when one of the following occurs:
   a flow rate of at least one of a lubricating oil or of a cooling oil circulating in each machine tool to one of lubricate or to cool an operation in each machine tool is detected and the flow rate falls below a lower limit value,
   a temperature detector is set at a constituent portion that performs one of a reciprocating movement or rotational movement in each machine tool and a detected temperature exceeds an upper limit value in a predetermined period,
   at least one of a replacement device for a tool to be used for working, a transfer device for the tool, a pallet on which a workpiece serving as a unit of the material to be worked is mounted, and a device for transferring the pallet does not operate although an input voltage or input current is applied to the drive motor for driving each device, or
   a flow rate of air blowing required to move at least one of chips and fumes generated due to an operation of each machine tool to a collector with a filter or an air pressure based on the air blowing is detected and the flow rate or the air pressure falls below a lower limit value.

7. The machine tool operation monitoring system according to claim 6, wherein mutually different colors are selected for the light irradiated by the color lamp and the light irradiated by the color lamp is projected onto the camera.

8. The machine tool operation monitoring system wherein each reflecting display plate defined in claim 1 is set at a position corresponding to a case in which an operation of each machine tool falls within a normal operating range, at a position corresponding to a case in which the operation exceeds the normal operating range, or at a position corresponding to a case in which the operation has ended, and the monitor records a state of change in the position of each reflecting plate along with aggregation of the frequency of abnormal operation breaking out in each machine tool.

9. A machine tool operation monitoring system that detects an abnormal operation in any of a plurality of machine which perform cutting work on a material, the system comprising:
   an optical sensor,
   a lamp provided for each machine tool for projecting emitted light as a projection onto the optical sensor situated at a position where the optical sensor can receive the emitted light from each lamp to identify the machine tool breaking out an operation abnormality when one of the following occurs:
      a torque of a drive motor exceeds a normal operating range in any of the plurality of machine tools,
      a speed of a drive motor exceeds a normal operating range in any of the plurality of machine tools, or
      moving positions of a constituent portion and of a material in one of reciprocating movement or rotational movement relative to the machine tool operated by the drive motor exceed a predetermined normal operating region range, and
   a monitor for monitoring a difference in a direction of said projection of the emitted light.

10. The machine tool operation monitoring system according to claim 9, wherein each lamp emits light in a color corresponding to a case in which an operation of each machine tool falls within a normal operating range, in a color corresponding to a case in which the operation exceeds the normal operating range, or in a color corresponding to a case in which the operation has ended, and the monitor records a state of change in the color of each machine tool along with aggregation of the frequency of abnormal operation breaking out in each machine tool.

11. The machine tool operation monitoring system according to claim 9, wherein one of the following is set as a standard for detecting the operation abnormality of a torque, speed or moving position deviated from a normal operating range:
   an input voltage for a drive motor, or
   an input current for the drive motor.

12. The machine tool operation monitoring system according to claim 9, wherein a number is assigned to each machine tool, and the machine tool which is identified by detecting the operation abnormality is additionally identified by displaying an image of the number.

13. The machine tool operation monitoring system according to claim 12, wherein the machine tool which is identified by detecting the operation abnormality is additionally identified by a sound providing an announcement of the number.

14. The machine tool operation monitoring system according to claim 9,
   further comprising at least one controller unit that controls each corresponding machine tool and which produces control output signals for the machine tools, and
   a lamp configured to irradiate emitted light in a color different from the reflected light,
   wherein, when at least some of all control output signals are not continuous for a predetermined period in each controller unit that controls each corresponding machine tool, the abnormal operation of the controller unit is notified by turning on the color lamp configured to irradiate emitted light in a different from the previously recited emitted light, and by projecting the emitted light of color onto the optical sensor.

15. The machine tool operation monitoring system according to claim 9, further comprising a lamp configured to irradiate emitted light in a color different from the previously recited emitted light, which is turned on to project said emitted light in a different color on the optical sensor when one of the following occurs:
   a flow rate of at least one of a lubricating oil or of a cooling oil circulating in each machine tool to one of lubricate or to cool an operation in each machine tool is detected and the flow rate falls below a lower limit value,
   a temperature detector is set at a constituent portion that performs one of a reciprocating movement or rotational movement in each machine tool and a detected temperature exceeds an upper limit value in a predetermined period,
   at least one of a replacement device for a tool to be used for working, a transfer device for the tool, a pallet on which a workpiece serving as a unit of the material to be worked is mounted, and a device for transferring the pallet does not operate although an input voltage or input current is applied to the drive motor for driving each device, or
   a flow rate of air blowing required to move at least one of chips and fumes generated due to an operation of each machine tool to a collector with a filter or an air pressure based on the air blowing is detected and the flow rate or the air pressure falls below a lower limit value.

16. The machine tool operation monitoring system according to claim 15, wherein mutually different colors are selected for the light irradiated by the color lamp and the light irradiated by the color lamp is projected onto the optical sensor.

* * * * *